(12) United States Patent
Shimizu et al.

(10) Patent No.: US 8,783,235 B2
(45) Date of Patent: Jul. 22, 2014

(54) AIR CLEANER STRUCTURE

(75) Inventors: Takahiko Shimizu, Wako (JP); Makoto Mitsukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 13/425,525

(22) Filed: Mar. 21, 2012

(65) Prior Publication Data

US 2012/0240895 A1   Sep. 27, 2012

(30) Foreign Application Priority Data

Mar. 24, 2011   (JP) ................... 2011-065236

(51) Int. Cl.
 *F01M 13/04*   (2006.01)
(52) U.S. Cl.
 USPC ........................................ 123/572
(58) Field of Classification Search
 USPC ............. 123/572–574, 41.86, 41.74, 41.1
 See application file for complete search history.

(56) References Cited

U.S. PATENT DOCUMENTS

| | | | |
|---|---|---|---|
| 6,425,451 B2* | 7/2002 | Yoshida et al. ............... | 180/219 |
| 2003/0070661 A1* | 4/2003 | Yasui ........................... | 123/572 |
| 2003/0079729 A1* | 5/2003 | Kunimitsu et al. ........... | 123/572 |
| 2005/0081837 A1* | 4/2005 | Nishi et al. ................... | 123/572 |
| 2005/0090371 A1* | 4/2005 | Nakajima et al. ............. | 477/181 |
| 2007/0245983 A1* | 10/2007 | Igarashi et al. ............. | 123/41.1 |
| 2008/0223348 A1* | 9/2008 | Togasawa ..................... | 123/572 |
| 2009/0071421 A1* | 3/2009 | Maehara et al. ........... | 123/41.86 |
| 2010/0170456 A1* | 7/2010 | Watanabe et al. .......... | 123/41.74 |

FOREIGN PATENT DOCUMENTS

JP   4280361 B2   6/2009

* cited by examiner

*Primary Examiner* — M. McMahon
(74) *Attorney, Agent, or Firm* — Birch, Stewart, Kolasch & Birch, LLP

(57) ABSTRACT

An air cleaner structure for a vehicle includes an air cleaner is mounted on a power unit. The air cleaner case is formed in a shape elongated from a side of the internal combustion engine toward a side of the rear wheel. An intake-air outlet passage connected to an upstream end of a connecting tube is formed forward in the front of the air cleaner case. A filter member is placed rearward of the intake-air outlet passage in the case. A blowby gas return passage connected to a blowby gas return pipe of the engine, and an additional air passage are juxtaposed with each other in a vertical direction and formed forward around the intake-air outlet passage in front of the air cleaner case such that the blowby gas return passage is located below the additional air passage. The resulting structure reduces a length of piping to the engine.

20 Claims, 10 Drawing Sheets

AIR CLEANER STRUCTURE

CROSS-REFERENCE TO RELATED APPLICATION

The present application claims priority under 35 U.S.C. §119 to Japanese Patent Application No. 2011-065236, filed Mar. 24, 2011. The entire contents of the above-identified application is hereby incorporated by reference.

BACKGROUND OF THE INVENTION

1. Field of the Invention

The present invention relates to a structure of an air cleaner for a scooter type vehicle using a power unit with an internal combustion engine and a power transmission device to the rear wheel integrated with each other.

2. Description of Background Art

For example, such an air cleaner is disclosed in the following JP Patent No. 4280361 (FIG. 5, FIG. 6) that in an air cleaner for a scooter type vehicle, placed above a power unit with an internal combustion engine and a power transmission device to the rear wheel integrated with each other, the air cleaner has a plurality of functions so that a blowby gas return pipe is connected for returning blowby gas from the internal combustion engine to the air cleaner, the blowby gas is sent together with intake air to the internal combustion engine so as to be burned, and an air opening pipe ("a vacuum conduit" in JP Patent No. 4280361 (FIG. 5, FIG. 6)) communicating with a carburetor is connected, and so on.

As disclosed in JP Patent No. 4280361 (FIG. 5, FIG. 6), if an air cleaner has a plurality of functions in a scooter type vehicle, the air cleaner is placed above a power unit which is vertically swingably supported on a vehicle-body frame. This produces constraints on space in the up-and-down directions in order to ensure the amount of vertical swinging motion in addition to constraints on space above the power unit in the fore-and-aft directions. From the viewpoint of this, accordingly, further improvements are required.

SUMMARY AND OBJECTS OF THE INVENTION

An object of the present invention is to provide an air cleaner structure enabling a reduction in length of piping to an internal combustion engine, and/or a reduction in space required for the air cleaner without degradation in performance of filtering, air suction and the like of the air cleaner when a plurality of functions converge into an air cleaner of a scooter type vehicle.

According to an embodiment of the present invention, an air cleaner structure for a scooter type vehicle includes an air cleaner mounted above a power unit with an internal combustion engine and a power transmission device connected to a rear wheel integrated with each other. The air cleaner case of the air cleaner is formed in a shape elongated from a side of the internal combustion engine toward a side of the rear wheel in a fore-and-aft direction when viewed from a side. An intake-air outlet passage, to which an upstream end of a connecting tube leading to the internal combustion engine is connected, is formed forward in the front of the air cleaner case, and a filter member of a cleaner element is placed in the rear of the intake-air outlet passage in the air cleaner case. A blowby gas return passage connected to a blowby gas return pipe of the internal combustion engine, and an additional air passage, which communicate with the interior of the air cleaner case, are juxtaposed with each other in a vertical direction and formed forward around the intake-air outlet passage in the front of the air cleaner case such that the blowby gas return passage is located below the additional air passage.

According to an embodiment of the present invention, the intake-air outlet passage is laterally juxtaposed with the blowby gas return passage and the additional air passage.

According to an embodiment of the present invention, the blowby gas return passage is disposed in a position near the intake-air outlet passage with respect to a mounting position of the filter member.

According to an embodiment of the present invention, the air cleaner has a structure divided into three in a right-left direction with respect to the direction of vehicle travel. The structure includes a vehicle outside case and a vehicle-center-side case which form the air cleaner case, and the cleaner element sandwiched between the cases and defining an unpurified room and a clean room. The cleaner element is provided with a base plate sandwiched between the vehicle outside case and the vehicle-center-side case, and the filter member is mounted on the base plate. The additional air passage is connected to the other end of an air opening pipe having one end connected to a carburetor which is connected to a downstream end of the connecting tube. An in-air-cleaner-case outlet of the blowby gas return passage located below the additional air passage, and includes an inner wall that extends from an inside surface of the vehicle-center-side case toward the base plate and has a leading end located near the base plate (75), and an outer wall that extends from the base plate toward an inside surface of the vehicle-center-side case, has a leading end located near the vehicle-center-side case, surrounds the inner wall, and extends rearward along an inner periphery of a mating face with the vehicle-center-side case.

According to an embodiment of the present invention, the filter member is arranged backward-upward in a rear portion of the air cleaner case, and an outlet for a liquid component in blowby gas to the outside of the air cleaner case is formed in the air cleaner case below the filter member.

According to an embodiment of the present invention, an outside-air inlet passage connected to an outside-air suction pipe for suction of outside air into the interior of the air cleaner case is formed forward in the front of the air cleaner case, and the outside-air suction pipe is disposed in a vehicle-width direction along the blowby gas return passage.

Advantageous Effects of Invention Include the Following

According to an embodiment of the present invention, the intake-air outlet passage connected to the upstream end of the connecting tube, the blowby gas return passage communicating with the interior of the air cleaner case, and the additional air passage are formed in the front of the air cleaner case. The pipes connected to a plurality of passages are laid along the connecting tube. Thereby, ease in laying of each pipe near the internal combustion engine is made greater.

Since the blowby gas return passage close to the additional air passage is juxtaposed with the additional air passage in a vertical direction so as to be provided below the additional air passage, and the filter member of the cleaner element is provided in the rear of the intake-air outlet passage, this makes it possible to lessen the influence of the blowby gas on the additional air passage and the filter member.

Accordingly, when a plurality of functions converge into the air cleaner of the scooter type vehicle, the piping to the internal combustion engine or the like can be structured in shorter length and a reduction in space required for the air cleaner can be achieved without degradation of performance of filtering, air suction and the like of the air cleaner.

According to an embodiment of the present invention, because the intake-air outlet passage, and the blowby gas return passage and the additional air passage are arranged in the right-and-left direction rather than the up-and-down direction, the length of the front of the air cleaner in the up-and-down direction can be reduced and therefore the front of the air cleaner can be placed closer to the internal combustion engine while permitting the vertical swing motion of the power unit, thus achieving shorter piping.

According to an embodiment of the present invention, the blowby gas flowing from the blowby gas return passage into the air cleaner case is readily sucked together with the intake air into the intake-air outlet passage disposed in a closer position than the filter member. As a result, the filter member is prevented from being made dirty by the blowby gas adhering to the filter member, thus increasing the service life of the filter member.

According to an embodiment of the present invention, the air opening pipe connected between the additional air passage and the carburetor is designed as further shorter pipe toward the carburetor which is connected to the downstream end of the connecting tube.

The inner wall and the outer wall are used to guide a flow of blowby gas to a lower rear area of the air cleaner case, resulting in prevention of the blowby gas from affecting the air opening pipe connected to the additional air passage which is located above the blowby gas return passage.

According to an embodiment of the present invention, because the outlet provided in a lower rear area for the liquid component in the blowby gas is located at an increased distance from the lower edge of the filter member, the heavier liquid components in the blowby gas have a reduced influence on the filter member, and are guided to the outside from the outlet provided in the rear lower area of the air cleaner case for the liquid components in the blowby gas. On the other hand, the lighter blowby gas is inhibited by the inner wall and the outer wall from reaching the filter member located backward-upward in the rear portion, then is sucked from the front area of the long air cleaner case of a smaller length in the up-and-down direction into the connecting tube connected to the intake-air outlet passage, and then sent to and burned in the internal combustion engine. As a result, a reduction in size in the up-and-down direction of the air cleaner case having a plurality of function is achieved.

According to an embodiment of the present invention, since the passages, including the outside-air inlet passage connected to the outside-air suction pipe for suction of outside air into the interior of the air cleaner case are formed collectively in the front of the air cleaner case, a wide space for the filter member can be ensured in the rear area of the air cleaner case, so that, while the flow of intake air around the filter member can be made smoothly to reduce the intake-air resistance, unbalanced adhesion of dust to the filter member can be prevented to increase the service life of the filter member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 corresponds to a view taken in the direction of the arrows IX-IX in FIG. 10.

DETAILED DESCRIPTION OF THE PREFERRED EMBODIMENTS

Figure 1:
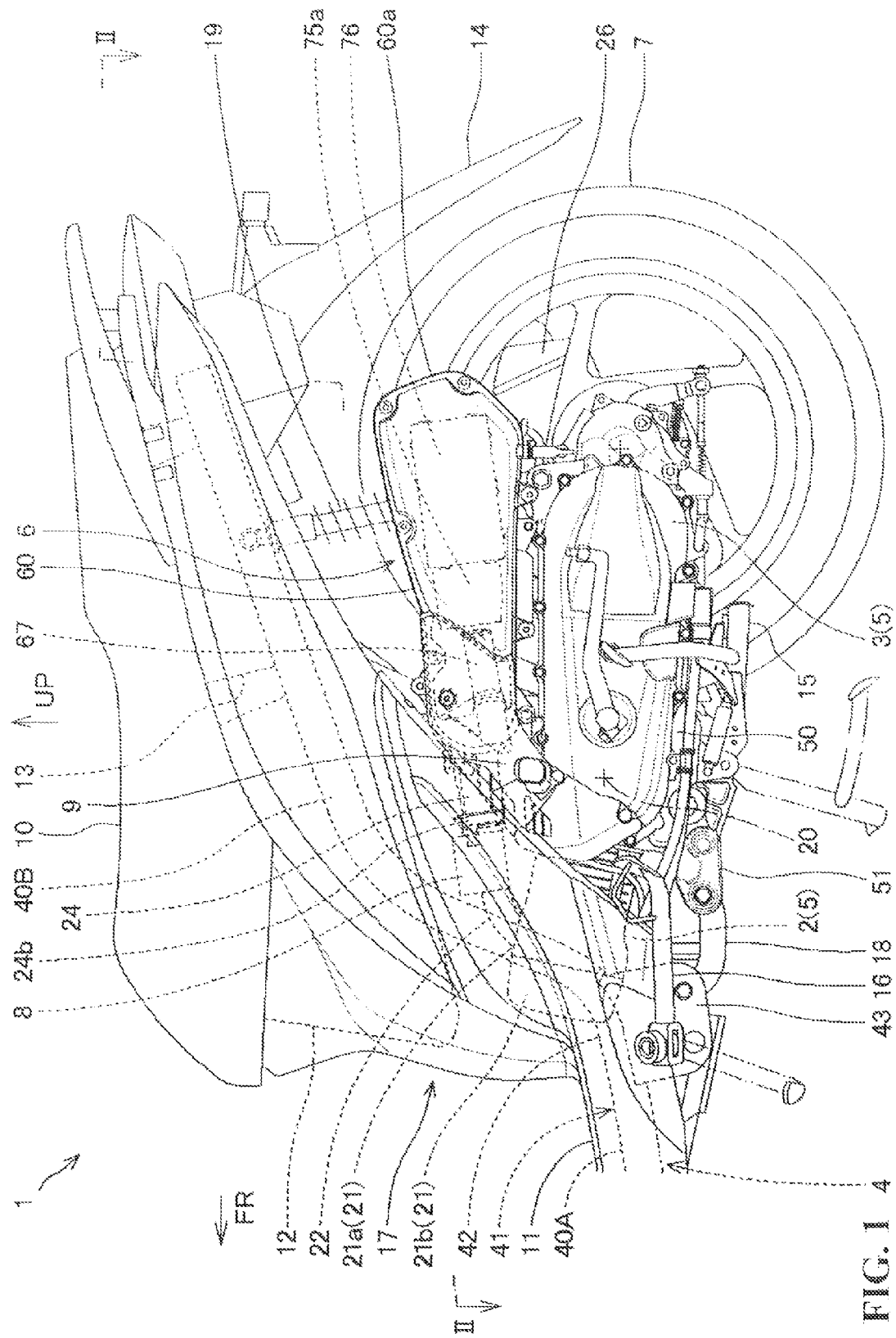
FIG. 1 is a left side view of an essential part of a motorcycle according to an embodiment of the present invention in which a part around a front wheel of the motorcycle is not shown.

An air cleaner structure according to an embodiment of the present invention will be described below with reference to FIG. 1 to FIG. 11.

In each drawing, a part of each device or member is cut off or overlaps, and representation of devices, members and the like except essential parts related to the present invention is omitted.

A small outline arrow appended in a device or pipe in each drawing schematically shows a direction of a flow of an intake gas sent to the internal combustion engine after the intake gas has been sucked in from the outside air and then passed through an air cleaner, while likewise a small solid arrow schematically shows a direction of a flow of a blowby gas.

Note that forward, rearward, rightward, leftward, upward and downward directions and the like in the description of the specification and the claims are pursuant to directions on a vehicle when a swing-type power unit supporting an air cleaner according to the embodiment is mounted on the scooter type vehicle, particularly, a scooter type motorcycle. In the drawings, the arrow FR indicates the forward direction of the vehicle, LH indicates the leftward direction of the vehicle, RH indicates the rightward direction of the vehicle and UP indicates the upward direction of the vehicle.

As a scooter type vehicle relating to an embodiment of the present invention, FIG. 1 shows a left side view of an essential part of a scooter type motorcycle 1 without showing the front wheel.

The motorcycle ("scooter type vehicle" in the present invention) 1 is provided with a swing-type power unit (hereinafter referred to simply as "power unit") 5 located below an occupant seat 10. The power unit 5 has an internal combustion engine 2 and a power transmission device 3 connected to the rear wheel which are integrated with each other and is vertically swingably attached to a vehicle-body frame 4. The internal combustion engine 2 is a single-cylinder, four-stroke cycle internal combustion engine. The power unit 5 is mounted on the motorcycle 1 such that a crankshaft 20 in a power unit case 50 is oriented in the vehicle-width direction of the motorcycle 1.

An intake air cleaner 6 of the internal combustion engine 2 is supported on the power unit 5.

In the motorcycle 1 according to the embodiment shown in FIG. 1, a pair of right and left front forks to which the front wheel is journaled is steerably pivoted through a steering stem on a head pipe located at a front end of the vehicle-body frame 4, which are not shown. Also, a steering handlebar is mounted on the top of the steering stem.

In the vehicle-body frame 4, a main frame extending diagonally rearward and downward from the head pipe is connected. A pair of right and left main frames 40A branch off from a lower portion of the main frame, and extend approximately horizontally rearward as illustrated in FIG. 1, to form a saddle section 41 having a bottom between the head pipe and the occupant seat 10 in order to improve the ease of straddling.

On the saddle section 41 a step floor 11 is connected to a lower rear portion of a front cover which is not shown.

The main frames 40A are followed by bends 42 formed at the rear of the step floor 11; which then extend diagonally upward and rearward as a pair of right and left rear main frames 40B, and then extend rearward while bending with reducing the angle of inclination.

A luggage box 12, a fuel tank 13 and the like in order from the front are supported between the rear main frames 40B, and the occupant seat 10 is supported so as to cover them.

In each of the pairs of right and left main frames 40A and right and left rear main frames 40B, a frame extending in the vehicle-width direction couples the right and left frames to each other.

Note that, in FIG. 1, reference sign 14 denotes a rear fender, 15 denotes a main stand and 16 denotes a side stand. The main stand 15 and the side stand 16 are shown by solid lines when being not used while traveling or the like and by phantom lines when being used.

The vehicle-body frame 4 is covered with a body cover 17 made mainly of a synthetic resin.

The power unit 5 is formed by integrating the internal combustion engine 2 located in a front portion with the power transmission device 3 located in a left rear portion, and is provided with a hanger 51 located in a front lower portion of the power unit case 50.

At the hanger 51, the power unit 5 is vertically swingably supported through a suspension link 18 by a pivot plate 43 attached to the bent 42 connected between the main frames 40A and the rear main frames 40B, and a left rear portion of the power unit 5 is supported through a rear cushion 19 by the rear main frames 40B to be allowed to move toward/away from the rear main frames 40B.

A rear wheel 7 serving as a drive wheel of the motorcycle 1 is journaled to a rear end of the power transmission device 3 provided in a rear portion of the power unit case 50 such that the rear wheel is adjacent to the right side.

A cylinder section 21 of the internal combustion engine 2 in which a cylinder block, a cylinder head and a cylinder head cover are fastened in such a manner as to be stacked in order is provided in a front side of the power unit case 50 while being tilted forward substantially horizontally.

An air cleaner case 60 of the air cleaner 6 is supported on the left side of the rear wheel 7 and above the power transmission device 3 of the power unit 5, that is, above the power unit case 50, such that a rear end 60a of the air cleaner case 60 is located more rearward than the rear cushion 19 mounted between the vehicle-body frame 4 and the power unit 5. That is, the air cleaner case 60 is formed in a shape elongated from the side of the internal combustion engine 2, or from the periphery of the cylinder section 21, toward the side of the rear wheel 7 in the fore-and-aft direction when viewed from the side.

An intake air pipe 22 extending from the top of the cylinder head 21a of the cylinder section 21 of the internal combustion engine 2 is bent rearward to connect through the carburetor 8 and a connecting tube 24 to an intake-air outlet passage 100 provided in a front portion of the air cleaner case 60 for communication with a clean room 64 described later.

Also, an exhaust pipe not shown extends downward from the cylinder head 21a of the cylinder section. The exhaust pipe then detours rightward to connect to a silencer 26 disposed on the right side of the vehicle.

Figure 3:
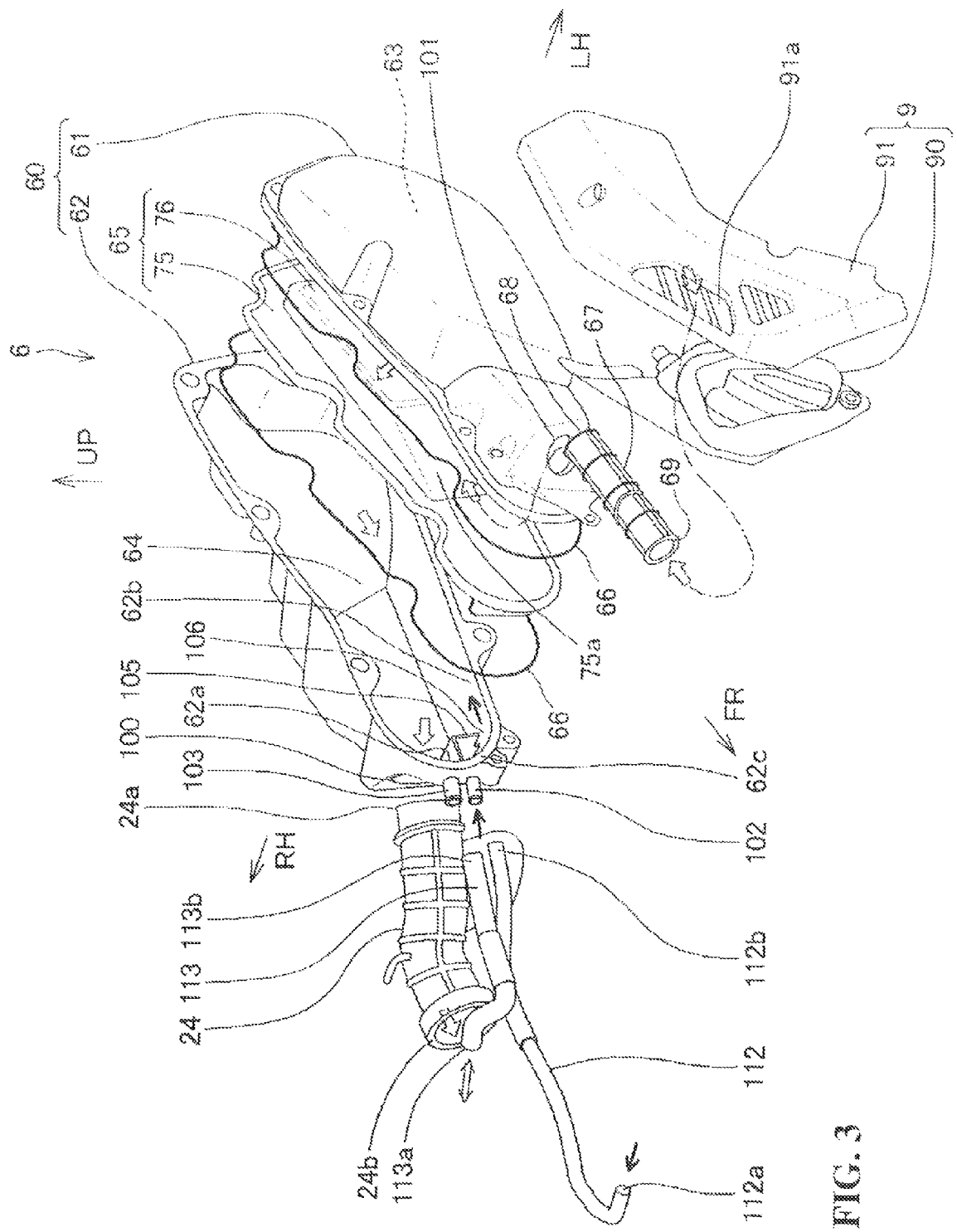
FIG. 3 is an exploded perspective view illustrating the structure of the overall air cleaner in the embodiment.

As shown in FIG. 3 (also see FIG. 4, FIG. 5), the air cleaner 6 has a three-block structure divided in the right-left direction with respect to the direction of vehicle travel, and has three blocks which are fastened to each other, a vehicle outside case 61 and a vehicle-center-side case 62 which form the air cleaner case 60, and a cleaner element 65 sandwiched between the cases and defining an unpurified room 63 and a clean room 64.

In FIG. 3, reference sign 66 denotes a seal member. Likewise, reference sign 9 denotes a suction opening cover described later, which includes an inside cover 90 and outside cover 91 and covers a front portion of the vehicle outside case 61.

That is, the cleaner element 65 is mounted in the air cleaner case 60, and the cleaner element 65 placed in the form of a flat plate with both sides facing in the right-left directions partitions the interior of the air cleaner case 60.

The unpurified room 63 is formed within the vehicle outside case 61 on the left side of the cleaner element 65. An outside-air inlet passage 101 is provided forward at the front of the vehicle outside case 61, and an outside-air suction pipe 67 is connected to the outside-air inlet passage for sucking outside air into the interior of the air cleaner case 60. An outlet opening 68 which is a downstream end of the outside-air suction pipe 67 opens rearward within the unpurified room 63 (see FIG. 4).

The clean room 64 is formed within the vehicle-center-side case 62 on the right side of the cleaner element 65. The intake-air outlet passage 100 is formed on front of the vehicle-center-side case 62 and is connected to an upstream end 24a of the connecting tube 24 leading to the internal combustion engine 2. The connecting tube 24 is attached forward to the intake-air outlet passage for a supply of the intake air purified in the clean room 64 into the internal combustion engine 2 via the carburetor 8. A downstream end 24b on the intake downstream side of the connecting tube 24 is connected to the carburetor 8 (see FIG. 1 and FIG. 2).

Figure 9:
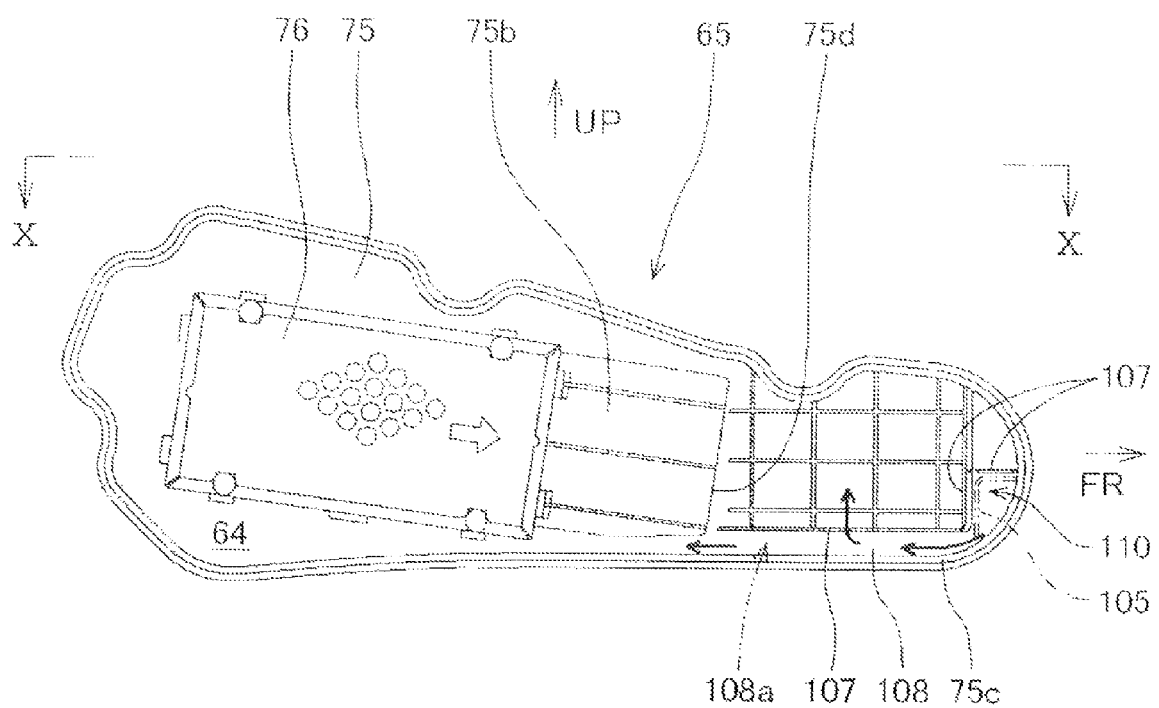
FIG. 9 is a right side view (clean-room side) of the cleaner element corresponding to a view taken in the direction of the arrows IX-IX in FIG. 4.
Figure 10:
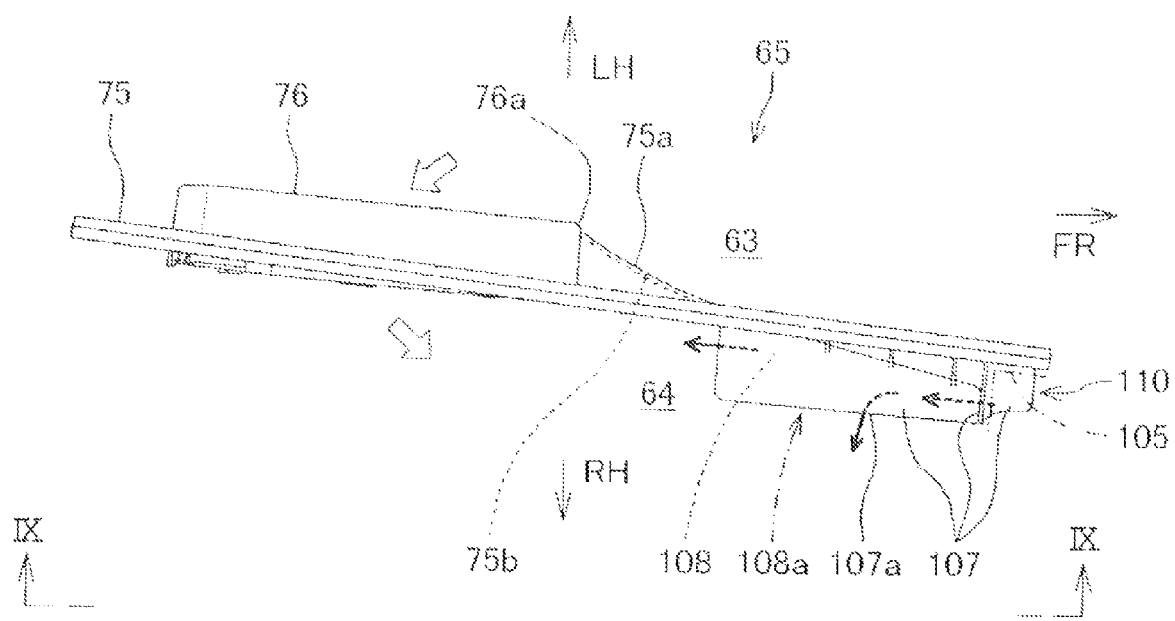
FIG. 10 is a top view of the cleaner element when viewed from the arrows X-X in FIG. 9.

The cleaner element 65 is provided with a base plate 75 held between the vehicle outside case 61 and the vehiclecenter-side case 62 and a filter member 76 mounted on the base plate 75 as illustrated in FIG. 9 and FIG. 10. In the filter member 76, when the intake air which is taken-in outside air travels from the unpurified room 63 through the clean room 64, dust and the like in the intake air are filtered out to clean the intake air.

The filter member 76 is situated in rear of the outlet opening 68 of the outside-air suction pipe 67 which opens into the unpurified room 63 of the air cleaner 6, and in the rear of the intake-air outlet passage 100 which is connected to the upstream end 24a of the connecting tube 24 and opens into the clean room 64. As shown in FIG. 1, the filter member 76 is located in a position overlapping the rear cushion 19 when viewed from the side.

Accordingly, the position of the rear end 60a is not restricted by the rear cushion 19, so that the air cleaner 6 is structured to have a sufficient length in the fore-and-aft direction and includes the filter member 76 of a sufficiently-large filter area.

In addition, the air cleaner 6 is formed in a shape elongated in the fore-and-aft direction when viewed from the side, so that a reduction in vertical dimensions can be achieved while ensuring a sufficient capacity of the air cleaner 6. As a result, interference with the vehicle-body frame 4 is lessened, reducing an increase in the height of the vehicle in order to allow for the vertical swinging motion of the power unit 5.

Figure 2:
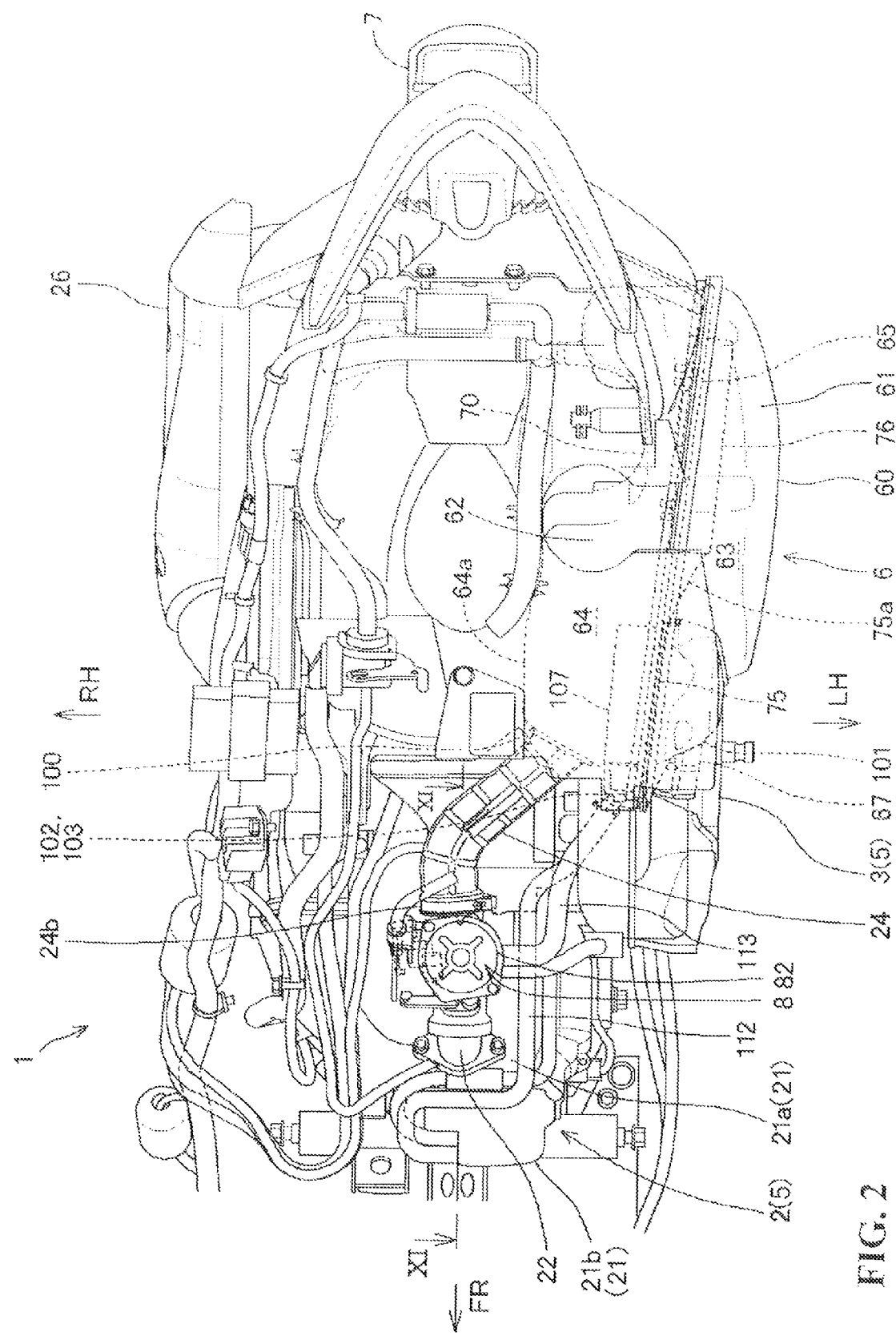
FIG. 2 is a plane view of an essential part of an air cleaner without an suction opening cover, a swing-type power unit and the like of the motorcycle according to the embodiment when viewed roughly from the arrows II-II in FIG. 1, in which representations of a vehicle-body frame and the covers are omitted.
Figure 4:
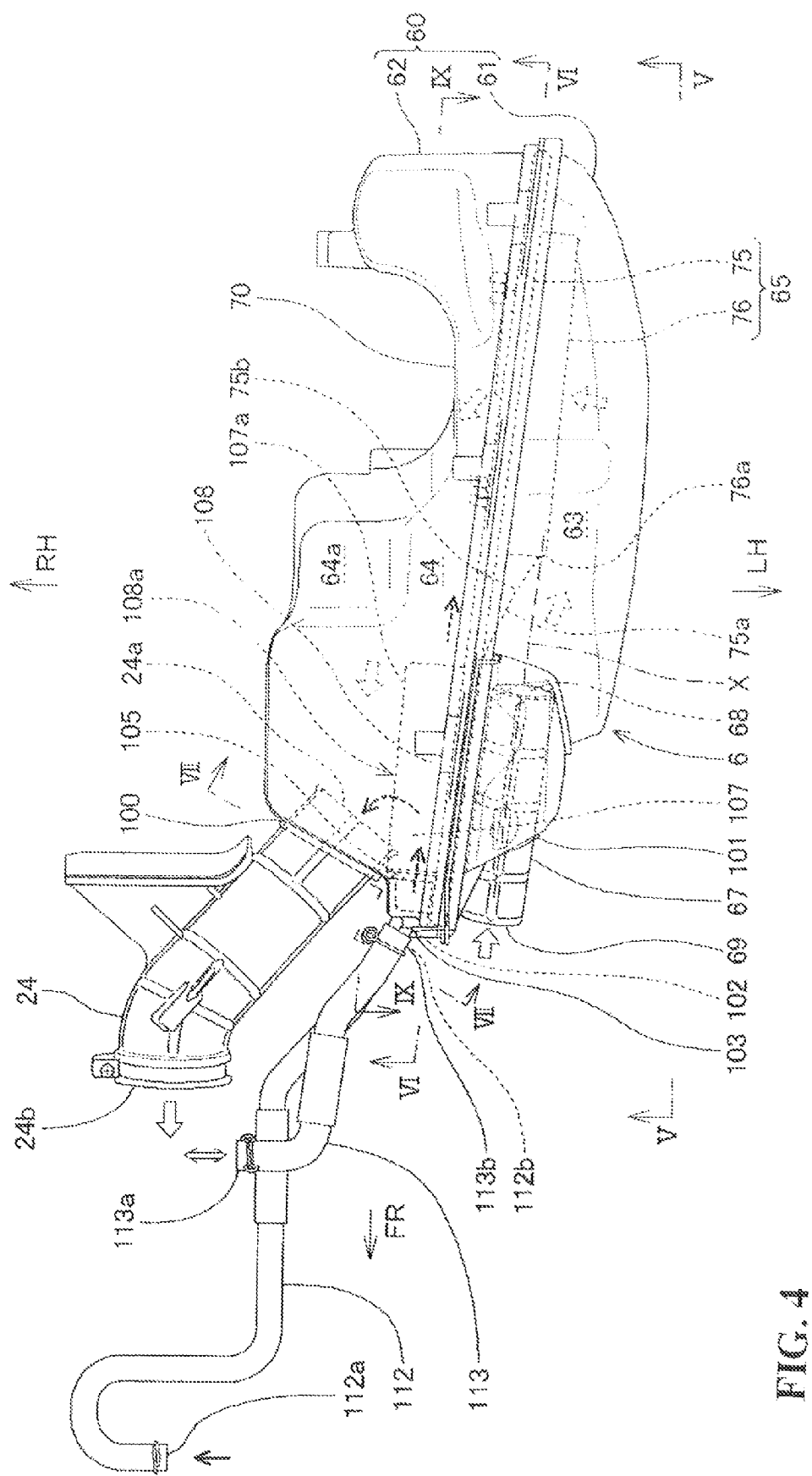
FIG. 4 is a plane view of the overall air cleaner without the suction opening cover in the embodiment.

Giving these factors, as shown in FIG. 2 and FIG. 4, the air cleaner case 60 has a groove-shaped recess 70 extending in the outer surface on the vehicle-center side of the vehicle-center-side case 62 in the up-and-down direction, in a position corresponding to the position of the rear cushion 19 in order to stay away from the rear cushion 19 adjacent to the air cleaner case while avoiding an increase in size in the vehicle-width direction.

As a result, the rear portion of the vehicle-center-side case 62 has a part of relatively smaller dimensions in the right-left direction, while an expansion portion 64a expanded toward the center of the vehicle is formed in a front portion of the vehicle-center-side case 62 located more forward than the groove-shaped recess 70, thus providing the clean room 64 of a sufficient volumetric capacity.

The filter member 76 is filled with a filtering medium such as filter paper and is disposed approximately parallel to the base plate 75 and in a position shifted toward the vehicle outside case 61 with respect to the base plate 75. In other words, the filter member protrudes toward the unpurified room 63.

The base plate 75 has an inclined portion 75a inclined with respect to the outlet axis X of the outside-air suction pipe 67 toward an extension of the outlet axis X to reach a protruding edge 76a of the filter member 76 in the unpurified room 63 as shown in FIG. 4 (see FIG. 10).

Thus, since the expansion portion 64a is provided and additionally the filter member 76 is placed in a shifted position, the clean room 64 is inhibited from being reduced in volumetric capacity. Also, since the volumetric capacity of the clean room 64 and the cross-sectional area of the flow passage are increased on the back face 75b of the inclined portion 75a of the base plate 75, the flow of intake air in the clean room 64 is prevented from being disturbed, resulting in a gentle flow.

On the other hand, in the unpurified room 63, the outside air flowing from the outside-air suction pipe 67 is guided by the inclined portion 75a to be sent into the rear portion of the unpurified room 63 while being prevented from becoming turbulent. Because of this, the outside air is sufficiently supplied uniformly into the filter member 76 having a large area and placed close to a rear portion of the air cleaner 6, thus improving the purification performance.

Figure 5:
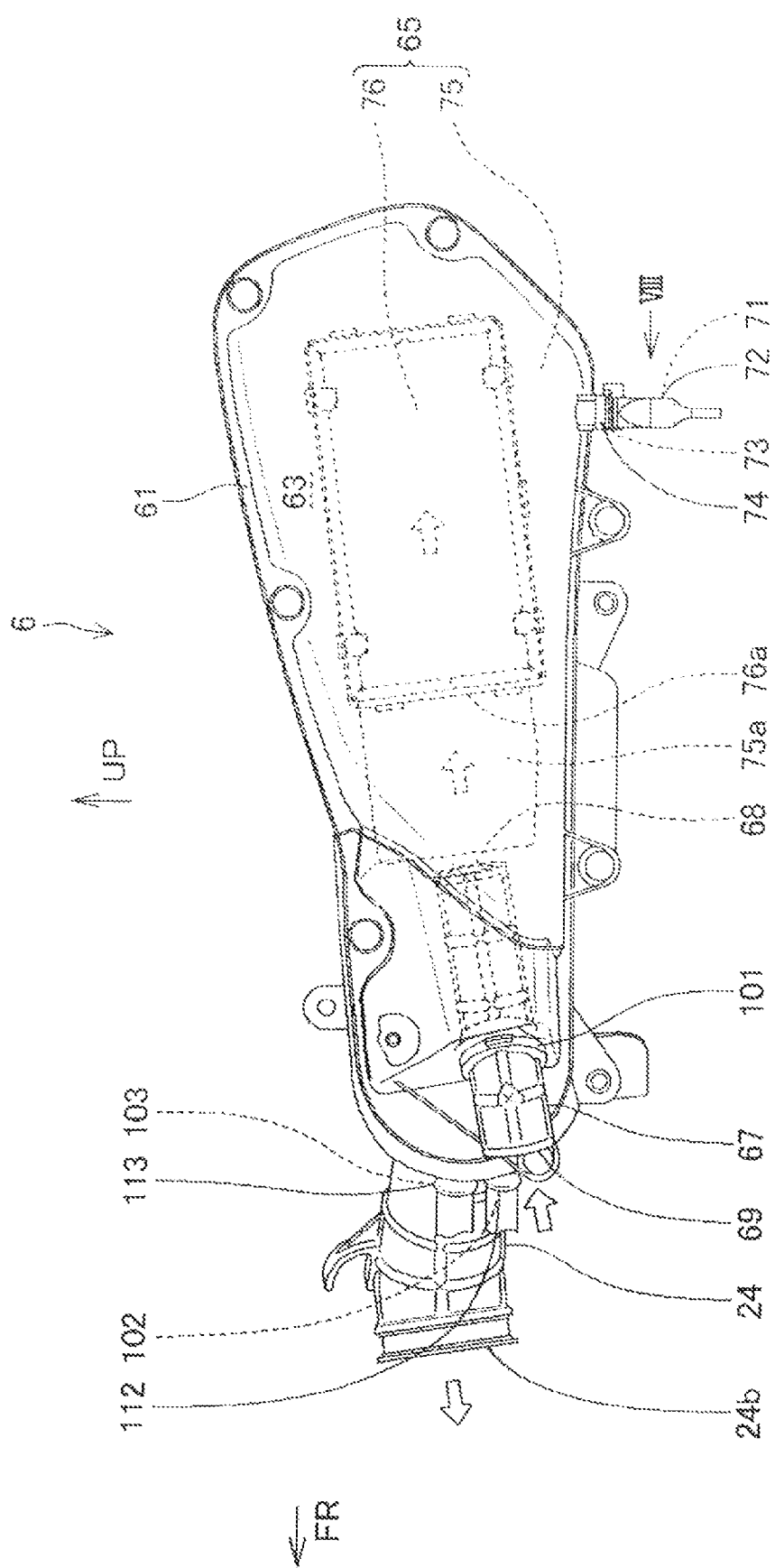
FIG. 5 is a left side view of the overall air cleaner without the suction opening cover when viewed from the arrows V-V in FIG. 4.
Figure 6:
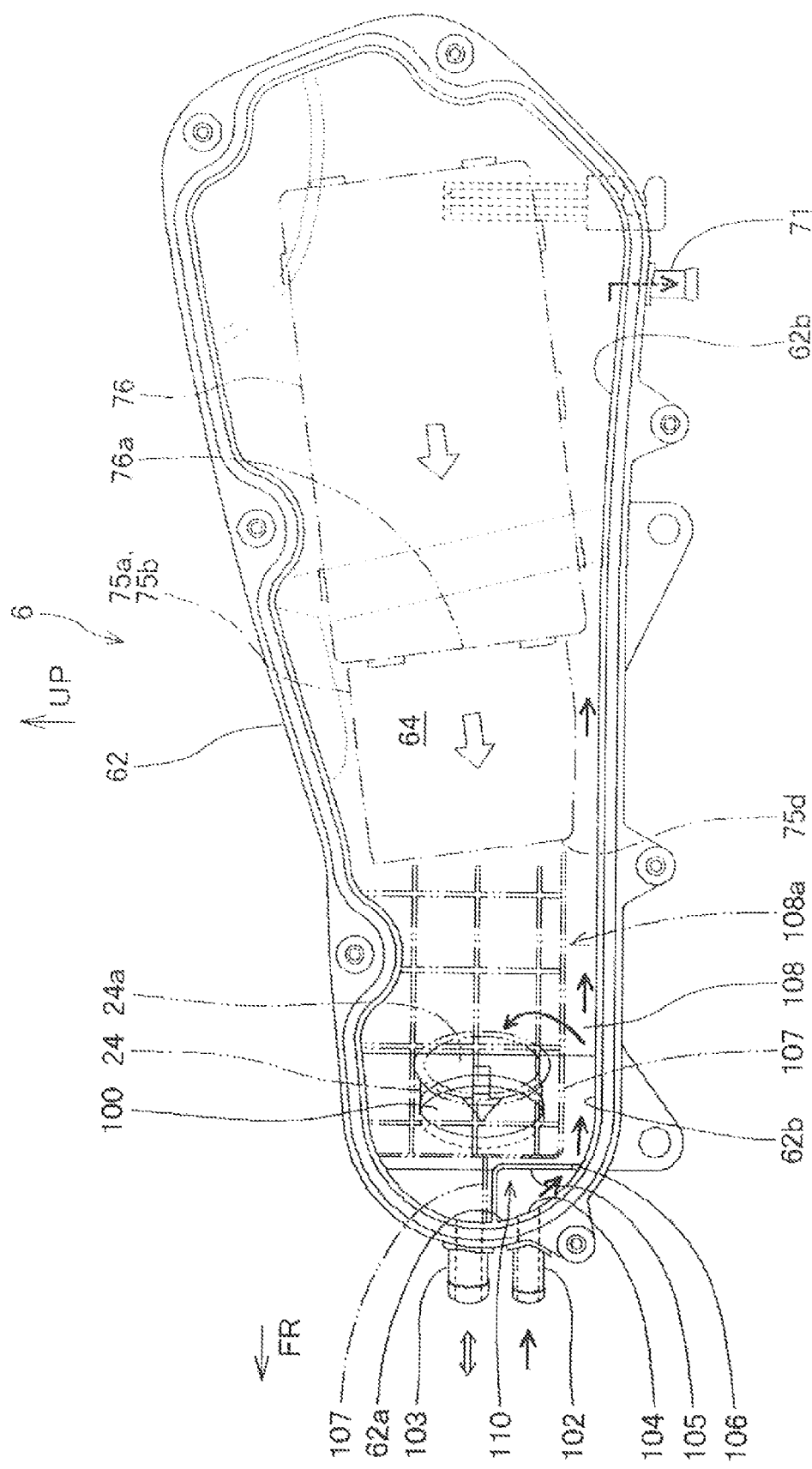
FIG. 6 is a left side view showing the interior of a vehicle center-side case of the air cleaner when viewed from the arrows VI-VI in FIG. 4.
Figure 7:
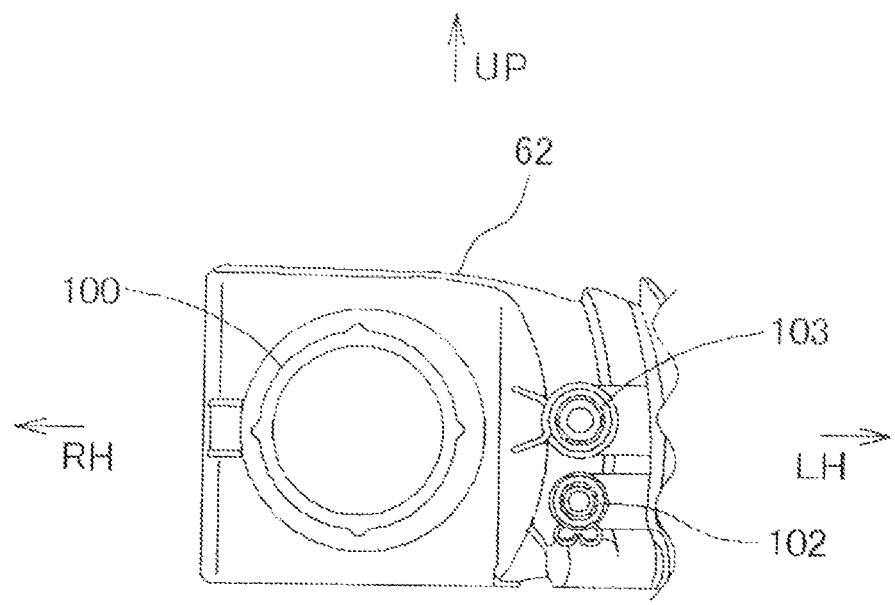
FIG. 7 is a front view of the vehicle center-side case of the air cleaner when viewed from the arrows in FIG. 4, which is an illustration of the layout of the air outlet passage, a blowby-gas return passage and the additional air passage.

A blowby gas return passage 102 and an air passage ("an additional air passage" in the present invention) 103 are formed around and in the left of the intake-air outlet passage 100 in the front of the vehicle-center-side case 62 of the air cleaner case 60 as shown in FIG. 4 to FIG. 6 and shown in detail in FIG. 7.

The blowby gas return passage 102 is juxtaposed in the vertical direction with the additional air passage 103 such that the blowby gas return passage 102 is located below the additional air passage 103, and the blowby gas return passage 102 and additional air passage 103 are laterally juxtaposed with the intake-air outlet passage 100.

The outside-air suction pipe 67 is disposed in the vehicle-width direction along the blowby gas return passage 102 (see FIG. 4).

Figure 11:
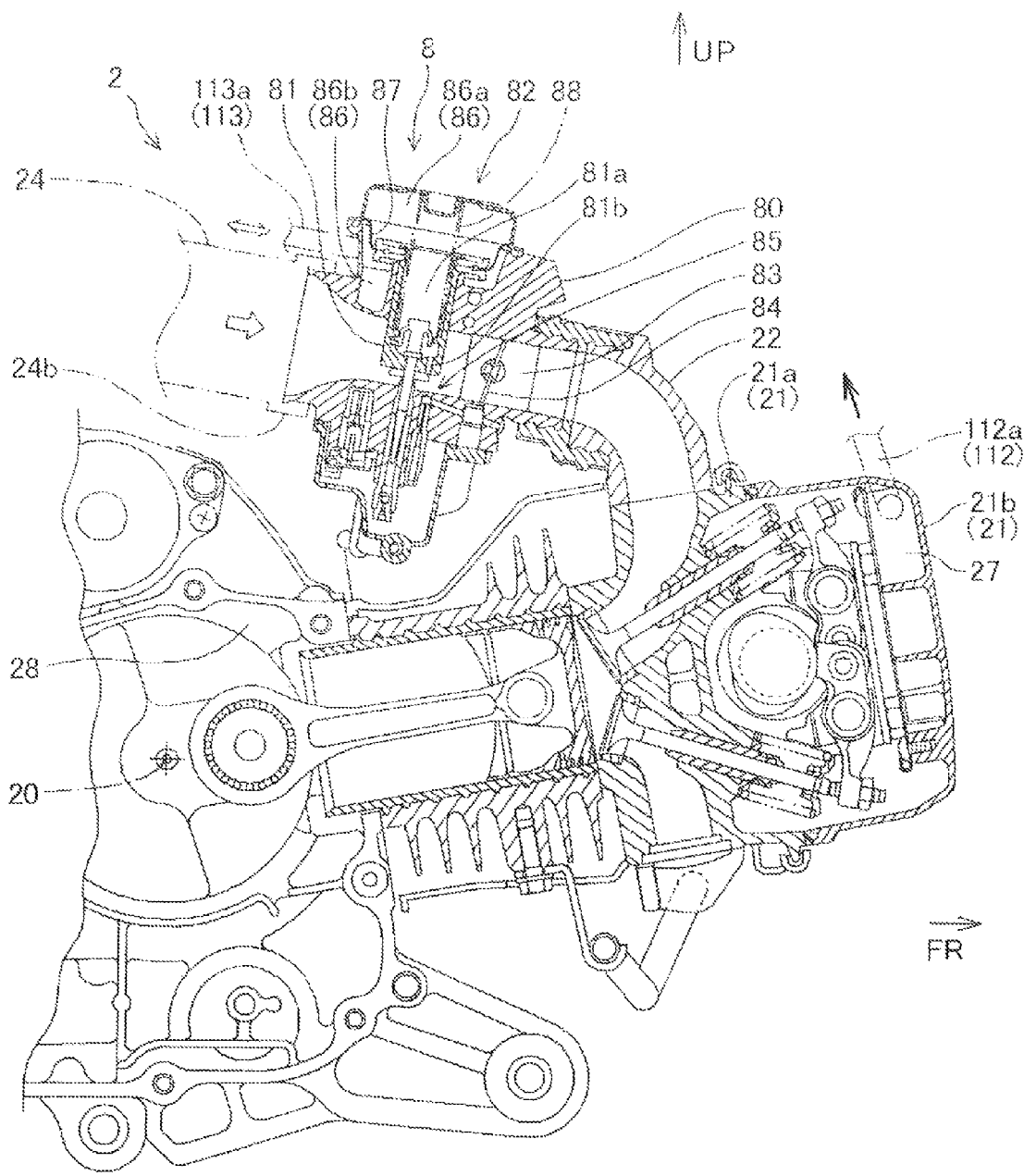
FIG. 11 is a sectional view of an internal combustion engine and a carburetor when viewed roughly from the arrows XI-XI in FIG. 2, which is an illustration of a connection to the air cleaner.

A downstream end 112b of a blowby gas return pipe 112 is connected to the blowby gas return passage 102, while an upstream end 112a thereof is connected to the cylinder head cover 21b of the cylinder section 21 to communicate with a breather chamber 27 in the cylinder head cover as shown in FIG. 2 and FIG. 11.

In the cylinder head cover 21b the breather chamber 27 is defined to communicate with a crank chamber 28 through a cam chain chamber, a reed valve and the like which are not shown.

The blowby gas return pipe 112 is a pipe for sucking a blowby gas from the breather chamber 27 into the air cleaner 6.

The blowby gas containing an unburned fuel component and the like is sucked from the interior of the crank chamber 28 into the breather chamber 27. Then, the blowby gas after having undergone separation of the oil component and the like is sent through the blowby gas return pipe 112 into the clean room 64 of the air cleaner 6, and then is sent together with intake air into the internal combustion engine 2 again for burning.

The additional air passage 103 is connected to the other end 113b of the air opening pipe 113 having one end 113a connected to an actuator 82 of the carburetor 8 such that the air opening pipe communicates with the actuator, as shown in FIG. 2 and FIG. 11.

The air opening pipe 113 is a pipe for transferring an intake pressure in the clean room 64 into the actuator 82 in order to adjust the control on the suction piston 81 of the carburetor 8 as described later.

A double-line double-headed arrow in each drawing schematically shows a transfer path of the intake pressure in the clean room 64.

As shown in FIG. 3 and FIG. 6, on the inside surface of the vehicle-center-side case 62, a labyrinth inner wall ("inner wall" in the present invention) 105 across a range between the front inner peripheral surface 62a of the vehicle-center-side case 62 and a lower inner peripheral surface 62b is formed around the in-case outlet 104 of the blowby gas return passage 102, and extends from the inside surface of the vehicle-center-side case 62 to the mating face 62c with the base plate 75 of the cleaner element 65, and a leading end of the inner wall is formed near the base plate 75.

A lower end of the labyrinth inner wall 105 is partially cut away to form a gap 106 creating space between the lower inner peripheral surface 62b and the labyrinth inner wall.

On the other hand, on the right-side surface of the cleaner element 65 joining the vehicle-center-side case 62, a labyrinth outer wall ("outer wall" in the present invention) 107 surrounding the labyrinth inner wall 105 and then extending rearward along the inner periphery of a mating face 75c of the base plate 75 with the vehicle-center-side case 62 extends from the base plate 75 toward the inside surface of the vehicle-center-side case 62, and a leading end of the outer wall is formed near the vehicle-center-side case 62.

The labyrinth outer wall 107 extends rearward approximately to a front end 75d of the back face 75b of the inclined portion 75a of the base plate 75 (see FIG. 9), while a right edge end 107a of the labyrinth outer wall 107 protrudes by a certain width into the interior of the vehicle-center-side case 62, that is, into the inside of the clean room 64, as shown in FIG. 4 and FIG. 10. Therefore, as shown in FIG. 9, the labyrinth outer wall 107 surrounds the labyrinth inner wall 105 and then defines a blowby gas flow path 108 along the lower inner peripheral face 62b in the vehicle-center-side case 62, that is, along the inner peripheral face of the clean room 64. At the right edge end 107a of the labyrinth outer wall 107, the right-side face of the blowby gas flow path 108 is opened such that the blowby gas can flow rightward in the clean room 64, and a right-side open area 108a is formed (see FIG. 4, FIG. 9, and FIG. 10).

As shown in FIG. 6, hence, the blowby gas, which has flown from the in-case outlet 104 of the blowby gas return passage 102 to the inside surface of the vehicle-center-side case 62, that is, into the inside of the labyrinth inner wall 105 formed on the inside surface of the clean room 64, travels through the gap 106 formed in the labyrinth inner wall 105, and then flows rearward along the blowby gas flow path 108 in a lower position of the labyrinth outer wall 107 extending rearward after surrounding the labyrinth inner wall 105.

At this stage, the blowby gas of a lighter gas enters from the right-side open area 108a of the blowby gas flow path 108 into the front of the clean room 64, is sucked together with the intake air into the upstream end 24a of the connecting tube 24 connected to the intake-air outlet passage 100, is supplied to the internal combustion engine 2, and is burned together with the fuel to be added at the carburetor 8.

That is, since the blowby gas return passage 102 is disposed in a position near the intake-air outlet passage 100 with respect to the mounting position of the filter member 76, the blowby gas is prevented from reaching the filter member 76 and sucked from the upstream end 24a of the connecting tube 24 connected to the intake-air outlet passage 100. As a result, the filter member 76 is prevented from being made dirty by the blowby gas adhering to the filter member 76.

An in-air-cleaner-case outlet 110 of the blowby gas return passage 102 is formed to have the labyrinth inner wall 105 and the labyrinth outer wall 107 surrounding the labyrinth inner wall 105 and extending rearward along the inner periphery of the mating face 75c of the base plate 75 with the vehicle-center-side case 62.

Because of this, the flow of blowby gas can be guided to a lower rear area of the air cleaner case 60, resulting in prevention of the blowby gas from entering into the additional air passage 103 which is located immediately above the blowby gas return passage 102.

As a result, the air opening pipe 113 connected to the additional air passage 103 is prevented from being affected by the blowby gas.

Heavier liquid components in the blowby gas, such as an unburned fuel component, an unseparated oil component, condensed water, flow down from the blowby gas flow path 108 in the vehicle-center-side case 62 further toward the rear along the lower inner peripheral face 62b.

A drain passage 71 serving as an outlet for the liquid components in the blowby gas is formed in the lower inner peripheral face 62b in a rear portion of the vehicle-center-side case 62. The drain passage 71 is positioned below the filter member 76 of the cleaner element 65. The liquid components in the blowby gas flow into the drain passage 71. Therefore, as shown in FIG. 6, the air cleaner case 60 is designed such that the lower inner peripheral face 62b slopes gradually down toward the rear, so that the drain passage 71 is provided in a lowest position.

On the other hand, as shown in FIG. 5 and FIG. 6, since the filter member 76 is arranged backward-upward in a rear portion of the air cleaner case 60 in the air cleaner case 60, the heavier liquid components in the blowby gas can keep a vertical distance from the filter member 76 so as to exert little influence on the filter member 76, and are guided to the outside from the drain passage 71 in the rear lower portion of the vehicle-center-side case 62 of the air cleaner case 60.

Figure 8:
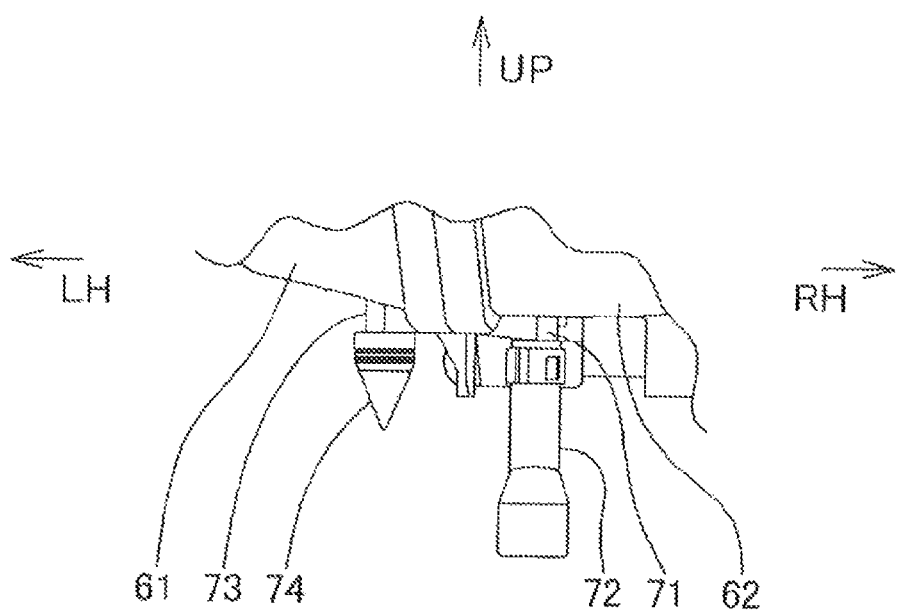
FIG. 8 is a rear view of a part of the air cleaner case in the embodiment when viewed from the arrows VIII-VIII in FIG. 5.

A resin or rubber cap 72 is mounted on the drain passage 71 as shown in FIG. 8 to temporarily hold the liquid components in the blowby gas.

Likewise, in the vehicle outside case 61, as shown in FIG. 5, separated water, such as rainwater entrained, and condensed water which is separated from outside air introduced into the unpurified room 63 of the air cleaner case 60 from the outside-air suction pipe 67, flows down on the lower inner peripheral face 61b of the vehicle outside case 61, into a drain passage 73 formed in a rear portion of the vehicle outside case 61, and then guided to the outside from the drain passage 73.

Therefore, as shown in FIG. 5, the air cleaner case 60 is designed such that the lower inner peripheral face 61b slopes gradually down toward the rear, and the drain passage 73 is provided in a lowest position.

The resin or rubber cap 74 is mounted on the drain passage 73 as shown in FIG. 8 to temporarily hold the separated water.

As shown in FIG. 11, the carburetor 8 in the embodiment is provided with a suction piston 81 for varying the diameter of a venturi 85. The suction piston 81 is located upstream of a throttle valve 84 for opening and closing an intake passage 83 which is formed in a carburetor main-body 80.

The actuator 82 allowing the suction piston 81 to protrude/recede includes a suction chamber 86 that is provided in a upper portion of the carburetor main-body 80, and a diaphragm 87 that is attached to the top end of the suction piston 81 inserted into the suction chamber 86 and partitions the suction chamber 86 into two rooms, an upper chamber 86a and a lower chamber 86b.

A spring 88 is provided in the upper chamber 86a to urge the suction piston 81 downward such that the bottom end or the suction piston 81 changes the diameter of the venturi 85 to minimum.

The upper chamber 86a communicates with the venturi 85 through a cylindrical space 81a inside the suction piston 81 and a communicating hole 81b pierced in the bottom end of the suction piston 81, so that the pressure in the upper chamber 86a varies approximately in accordance with the pressure in the venturi 85.

On the other hand, the lower chamber 86b is connected to one end 113a of the air opening pipe 113 for communication. The other end 113b of the air opening pipe 113 communicates in the additional air passage 103 with the clean room 64 of the air cleaner case 60.

As a result, the pressure in the lower chamber 86b varies approximately in accordance with the intake-air pressure in the clean room 64.

When the throttle valve 84 closes during idling or the like, the amount of intake air passing through the venturi 85 is small and vacuum generated in the venturi 85 is reduced. Accordingly, the vacuum in the upper chamber 86 is also reduced, so that the spring 88 presses the suction piston 81 down to reduce the diameter of the venturi 85 to minimum.

Upon open of the throttle valve 84, the amount of intake air passing through the venturi 85 is increased so as to cause the vacuum generated in the venturi 85 to build up, so that the vacuum is increased in the upper chamber 86a to raise the suction piston until a balance is achieved against the force of the spring 88, resulting in an increase in the diameter of the venturi.

Therefore, since the opening of the venturi 85 is automatically varied in accordance with the opening of the throttle valve 84, it is possible to make a smooth response to sudden opening/closing of the throttle valves 84 to moderate the output power characteristics of the internal combustion engine 2. On the other hand, in the embodiment the action of the vacuum in the upper chamber 86a is adjusted such that the action is dependent on a difference from the intake-air pressure in the clean room 64 acting on the lower chamber 86, thus achieving control on the venturi 85 more suited to operational situation of the internal combustion engine 2.

In the embodiment, the aforementioned air opening pipe 113 placed for adjustment to the carburetor 8 is connected in the front portion of the air cleaner case 60 to the additional air passage 103 formed forward in a position adjacent to and above the blowby gas return passage 102. For this reason, the air opening pipe 113 having a shorter length can be laid near the internal combustion engine 2, resulting in greater ease in handling and higher responsivity for allowing the intake-air pressure in the clean room 64 to act on the lower chamber 86b.

Since the blowby gas introduced from the blowby gas return passage 102 into the air cleaner case 60 is prevented from flowing toward the additional air passage 103 by the labyrinth inner wall 105 and the outer wall 107 as described above, the blowby gas is prevented from intruding into the actuator 82 of the carburetor 8 so as to affect the functions of the actuator 82.

In FIG. 2, FIG. 4 and FIG. 5, for the air cleaner 6 in the embodiment, the air cleaner case 60 is shown without the suction opening cover 9 shown in FIG. 3.

In the air cleaner 6 in the embodiment, the suction opening cover 9 includes the inside cover 90 and the outside cover 91, which are shown in FIG. 3, is mounted on the front portion of the air cleaner case 60 as illustrated in FIG. 1.

Specifically, a suction opening 69 of the front leading end of the outside-air suction pipe 67 mounted forward on the front of the vehicle outside case 61 protrudes forward from the vehicle outside case 61 and both sides of the suction opening are covered with the inside cover 90 and the outside cover 91 of the suction opening cover 9.

An air-intake opening 91a opening in a lateral direction is formed in the outside cover 91, so that outside air introduced from the lateral direction of the vehicle travels between the outside cover 91 and the inside cover 90 and then is sucked from the suction opening 69 of the front leading end of the outside-air suction pipe 67.

Accordingly, since the intrusion of dust from the front direction is prevented by protection of the suction opening cover 9, it is possible to dispose the outside-air suction pipe 67 in a forward position in order to ensure a sufficient distance between the filter member 76 and the outlet opening 68 of the outside-air suction pipe 67, resulting in a smooth flow of the intake air before and after the filter member 76.

In the air cleaner structure in the embodiment described above, the outside air, which is sucked from the air-intake opening 91a of the suction opening cover 9, travels through the outside-air suction pipe 67, then enters the unpurified room 63 of the air cleaner 6, then is cleaned by passing through the filter member 76 of the cleaner element 65 located in a rear portion of the unpurified room, and then enters the clean room 64. The cleaned intake air flows in the clean room 64 toward the upstream end 24a of the connecting tube 24 which is connected to the intake-air outlet passage 100 located on the front of the clean room 64.

Then, the cleaned intake air is sent through the connecting tube 24, the carburetor 8 and the intake air pipe 22 to the internal combustion engine 2 in which the fuel mixed with the cleaned intake air in the carburetor 8 is burned.

On the other hand, a blowby gas, which flows from the crank chamber 28 of the internal combustion engine 2 and from which an oil component is separated in the breather chamber 27, travels through the blowby gas return pipe 112 and then flows from the blowby gas return passage 102 into the clean room 64 of the air cleaner case 60. The labyrinth inner wall 105 and the labyrinth outer wall 107 which form the in-air-cleaner-case outlet 110 prevent the lighter gas component from reaching the filter member 76 of the cleaner element 65, then the blowby gas, together with the intake air, is sucked into the upstream end 24a of the connecting tube 24, and then sent through the connecting tube 24, the carburetor 8 and the intake air pipe 22 to the internal combustion engine 2 in which the fuel mixed with the blowby gas in the carburetor 8 is burned.

The intake-air pressure in the clean room acts, from the additional air passage 103 formed in the front of the air cleaner case 60 through the air opening pipe 113 connected between the air passage 103 and the carburetor 8, on the actuator 82 of the suction piston 81 of the carburetor 8, so that the control on the opening of the venturi 85 of the carburetor 8 is adjusted.

In this regard, with the air cleaner structure as described above, all of the intake-air outlet passage 100, the blowby gas return passage 102 and the additional air passage 103 are formed in the front of the air cleaner case without degradation of performance of filtering, air suction and the like of the air cleaner. Because of this, the piping for each of the internal combustion engine 2 and the carburetor 8 can be structured in a shorter length, making it possible to reduce the space required for the air cleaner.

Features of the air cleaner structure for compact vehicles according to the embodiment will be briefly described below.

Specifically, with the air cleaner structure according to the embodiment, in the air cleaner 6 for the motorcycle 1, being mounted above the power unit 5 with the internal combustion engine 2 and a power transmission device 3 to the rear wheel 7 integrated with each other, the air cleaner case 60 of the air cleaner 6 is formed in a shape elongated from a side of the internal combustion engine 2 toward a side of the rear wheel 7 in the fore-and-aft direction when viewed from a side; the intake-air outlet passage 100, to which the upstream end 24a of the connecting tube 24 leading to the internal combustion engine 2 is connected, is formed forward in the front of the air cleaner case 60; the filter member 76 of the cleaner element 65 is placed in the rear of the intake-air outlet passage 100 in the air cleaner case 60; and the blowby gas return passage 102 connected to the blowby gas return pipe 112 of the internal combustion engine 2, and the additional air passage 103, which communicate with the interior of the air cleaner case 60, are juxtaposed with each other in a vertical direction and formed forward around the intake-air outlet passage 100 in the front of the air cleaner case 60 such that the blowby gas return passage 102 is located below the additional air passage 103.

Accordingly, the intake-air outlet passage 100 connected to the upstream end 24a of the connecting tube 24, the blowby gas return passage 102 communicating with the interior of the air cleaner case 60, and the additional air passage 103 are formed in the front of the air cleaner case 60. The pipes 112, 113 connected to a plurality of passages 102, 103 are laid along the connecting tube 24. Thereby, ease in handling of each pipes 112, 113 near the internal combustion engine is made greater.

Since the blowby gas return passage 102 close to the additional air passage 103 is juxtaposed with the air passage in a vertical direction such that the blowby gas return passage is located below the additional air passage 103, and the filter member 76 of the cleaner element 65 is provided in the rear of the intake-air outlet passage 100, this makes it possible to lessen the influence of the blowby gas on the additional air passage 103 and the filter member 76.

Accordingly, when a plurality of functions converge into the air cleaner 6 of the motorcycle 1, the piping to the internal combustion engine 2 or the like can be structured in shorter length and a reduction in space required for the air cleaner 6 can be achieved without degradation of performance of filtering, air suction and the like of the air cleaner 6.

The intake-air outlet passage 100 is laterally juxtaposed with the blowby gas return passage 102 and the additional air passage 103.

Because the intake-air outlet passage 100, and the blowby gas return passage 102 and the additional air passage 103 are arranged in the right-and-left direction rather than the up-and-down direction, the length of the front of the air cleaner 6 in the up-and-down direction can be reduced and therefore the front of the air cleaner can be placed closer to the internal combustion engine 2 while permitting the vertical swing motion of the power unit 5, thus achieving shorter piping.

The blowby gas return passage 102 is disposed in a position closer to the intake-air outlet passage 100 with respect to the mounting position of the filter member 76.

Because of this, the blowby gas flowing from the blowby gas return passage 102 into the air cleaner case 60 is readily sucked together with the intake air into the intake-air outlet passage 100 disposed in a closer position than the filter member 76. As a result, the filter member 76 is prevented from being made dirty by the blowby gas adhering to the filter member 76, thus increasing the service life of the filter member 76.

The air cleaner 6 has a structure divided into three in the right-left direction with respect to the direction of vehicle travel, includes the vehicle outside case 61 and the vehicle-center-side case 62 which form the air cleaner case 60, and the cleaner element 65 sandwiched between the cases and defining an unpurified room 63 and the clean room 64. The cleaner element 65 is provided with the base plate 75 sandwiched between the vehicle outside case 61 and the vehicle-center-side case 62, and the filter member 76 mounted on the base plate 75. The additional air passage 103 is connected to the other end 113b of the air opening pipe 113 having one end 113a connected to the carburetor 8 which is connected to the downstream end 24b of the connecting tube 24. The in-air-cleaner-case outlet 110 of the blowby gas return passage 102 located below the additional air passage 103 and includes the labyrinth inner wall 105 which extends from the inside surface of the vehicle-center-side case 62 toward the base plate 75 and has the leading end located near the base plate 75, and the labyrinth outer wall 107 which extends from the base plate 75 toward the inside surface of the vehicle-center-side case 62, has the leading end located near the vehicle-center-side case 62, surrounds the labyrinth inner wall 105, and extends rearward along the inner periphery of the mating face 75c with the vehicle-center-side case 62.

Because of this, the air opening pipe 113 connected between the air passage 103 and the carburetor 8 is laid as further shorter pipe toward the carburetor 8 which is connected to the downstream end 24b of the connecting tube 24.

The labyrinth inner wall 105 and the labyrinth outer wall 107 are used to guide a flow of blowby gas to a lower rear area of the air cleaner case 60, resulting in prevention of the blowby gas from affecting the air opening pipe 113 connected to the additional air passage 103 which is located above the blowby gas return passage 102.

The filter member 76 is arranged backward-upward in a rear portion of the air cleaner case 60. The drain passage 71 serving as an outlet for the liquid components in the blowby gas to the outside of the air cleaner case 60 is formed in the air cleaner case 60 below the filter member 76.

Accordingly, because the drain passage 71 provided in a lower rear area for the liquid component in the blowby gas is located at an increased distance from the lower edge of the filter member 76, the heavier liquid components in the blowby gas has a reduced influence on the filter member 76, and are guided to exit to the outside from the drain passage 71 provided in the rear lower area of the air cleaner case 60 for the liquid components in the blowby gas. On the other hand, the lighter blowby gas is inhibited by the labyrinth inner wall 105 and the labyrinth outer wall 107 from reaching the filter member 76 arranged backward-upward, then is sucked from the front area of the long air cleaner case 60 of a smaller length in the up-and-down direction into the connecting tube 24 connected to the intake-air outlet passage 100, and then sent to and burned in the internal combustion engine 2. As a result, a reduction in size in the up-and-down direction of the air cleaner case 60 having a plurality of function is achieved.

The outside-air inlet passage 101 connected to the outside-air suction pipe 67 for suction of outside air into the interior of the air cleaner case 60 is formed forward in the front of the air cleaner case 60. The outside-air suction pipe 67 is disposed outside in the vehicle-width direction along the blowby gas return passage 102.

Accordingly, since the passages 100, 101, 102, 103, including the outside-air inlet passage 101 connected to the outside-air suction pipe 67 for suction of outside air into the interior of the air cleaner case 60 are formed collectively in the front of the air cleaner case 60, a wide space for the filter member 76 can be ensured in the rear area of the air cleaner case 60, so that, while the flow of intake air around the filter member 76 can be made smoothly to reduce the intake-air resistance, unbalanced adhesion of dust to the filter member 76 can be prevented to increase the service life of the filter member 76.

The invention being thus described, it will be obvious that the mine may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner structure of an air cleaner for a scooter type vehicle is mounted above a power unit which has an integrated internal combustion engine and a power transmission device connected to a rear wheel, comprising:

an air cleaner case of the air cleaner formed in a shape elongated from a side of the internal combustion engine toward a side of the rear wheel in a fore-and-aft direction when viewed from a side;

an intake-air outlet passage, to which an upstream end of a connecting tube leading to the internal combustion engine is connected, formed forward in a front of the air cleaner case;

a filter member of a cleaner element placed at a rear of the intake-air outlet passage in the air cleaner case; and a blowby gas return passage connected to a blowby gas return pipe of the internal combustion engine, wherein the blowby gas return passage and an additional air passage, which communicate with an interior of the air cleaner case, are juxtaposed with each other in a vertical direction and are formed forward around the intake-air outlet passage in the front of the air cleaner case such that the blowby gas return passage is located below the additional air passage.

2. The air cleaner structure according to claim wherein the intake-air outlet passage is laterally juxtaposed with the blowby gas return passage and the additional air passage.

3. The air cleaner structure according to claim 2, wherein the blowby gas return passage is disposed in a position near the intake-air outlet passage with respect to a mounting position of the filter member.

4. The air cleaner structure according to claim 3, wherein the air cleaner has a structure divided into three in a right-left direction with respect to a direction of vehicle travel, the structure including a vehicle outside case and a vehicle-center-side case which form the air cleaner case, and the cleaner element sandwiched between the cases and defining an unpurified room and a clean room, and wherein the cleaner element is provided with a base plate sandwiched between the vehicle outside case and the vehicle-center-side case, and the filter member mounted on the base plate; and wherein the additional air passage is connected to a rear end of an air opening pipe, the air opening pipe having a forward end connected to a carburetor, and the carburetor being connected to a downstream end of the connecting tube; and further comprising:

an in-air-cleaner-case outlet of the blowby gas return passage located below the additional air passage, wherein the in-air-cleaner-case outlet includes:

an inner wall that extends from an inside surface of the vehicle-center-side case toward the base plate and has a leading end located near the base plate, and an outer wall that extends from the base plate toward an inside surface of the vehicle-center-side case, has a leading end located near the vehicle-center-side case, surrounds the inner wall, and extends rearward along an inner periphery of a mating face with the vehicle-center-side case.

5. The air cleaner structure according to claim 4, wherein the filter member is arranged backward-upward in a rear portion of the air cleaner case, and an outlet for a liquid component in blowby gas to an outside of the air cleaner case is formed in the air cleaner case below the filter member.

6. The air cleaner structure according to claim 2, wherein an outside-air inlet passage connected to an outside-air suction pipe for suction of outside air into an interior of the air cleaner case is thrilled forward in the front of the air cleaner case, and the outside-air suction pipe is disposed outside in a vehicle-width direction along the blowby gas return passage.

7. The air cleaner structure according to claim 3, wherein an outside-air inlet passage connected to an outside-air suction pipe for suction of outside air into an interior of the air cleaner case is formed forward in the front of the air cleaner case, and the outside-air suction pipe is disposed outside in a vehicle-width direction along the blowby gas return passage.

8. The air cleaner structure according to claim 4, wherein an outside-air inlet passage connected to an outside-air suction pipe for suction of outside air into an interior of the air cleaner case is formed forward in the front of the air cleaner case, and the outside-air suction pipe is disposed outside in a vehicle-width direction along the blowby gas return passage.

9. The air cleaner structure according to claim 5, wherein an outside-air inlet passage connected to an outside-air suction pipe for suction of outside air into an interior of the air cleaner case is formed forward in the front of the air cleaner case, and the outside-air suction pipe is disposed outside in a vehicle-width direction along the blowby gas return passage.

10. The air cleaner structure according to claim 4, wherein the air opening pipe is a pipe for transferring an intake pressure to the clean room of the air cleaner.

11. An air cleaner structure of an air cleaner for a scooter type vehicle is mounted above a power unit which has an integrated internal combustion engine and a power transmission device connected to a rear wheel, comprising:

an air cleaner case of the air cleaner formed in a shape elongated from a side of the internal combustion engine toward a side of the rear wheel in a fore-and-aft direction when viewed from a side;

an intake-air outlet passage, to which an upstream end of a connecting tube leading to the internal combustion engine is connected, formed forward in a front of the air cleaner case;

a filter member of a cleaner element placed at a rear of the intake-air outlet passage in the air cleaner case; and a blowby gas return passage connected to a blowby gas return pipe of the internal combustion engine, wherein the blowby gas return passage and an additional air passage, which communicate with an interior of the air cleaner case, are juxtaposed with each other in a vertical direction and are formed forward around the intake-air outlet passage in the front of the air cleaner case such that the blowby gas return passage is located below the additional air passage, wherein the air cleaner case includes an expansion portion which bulges inwardly in a lateral direction at a forward portion of the air cleaner case, wherein the filter member is arranged in a rear portion of the air cleaner case.

12. The air cleaner structure according to claim 11, wherein the intake-air outlet passage is laterally juxtaposed with the blowby gas return passage and the additional air passage.

13. The air cleaner structure according to claim 12, wherein the blowby gas return passage is disposed in a position near the intake-air outlet passage with respect to a mounting position of the filter member.

14. The air cleaner structure according to claim 13, wherein the air cleaner has a structure divided into three in a right-left direction with respect to a direction of vehicle travel, the structure including a vehicle outside case and a vehicle-center-side case which form the air cleaner case, and the cleaner element sandwiched between the cases and defining an unpurified room and a clean room, and wherein the cleaner element is provided with a base plate sandwiched between the vehicle outside case and the vehicle-center-side case, and the filter member mounted on the base plate; and wherein the additional air passage is connected to a rear end of an air opening pipe, the air opening pipe having a forward end connected to a carburetor, and the carburetor being connected to a downstream end of the connecting tube; and further comprising:
an in-air-cleaner-case outlet of the blowby gas return passage located below the additional air passage,
wherein the in-air-cleaner-case outlet includes:
an inner wall that extends from an inside surface of the vehicle-center-side case toward the base plate and has a leading end located near the base plate, and
an outer wall that extends from the base plate toward an inside surface of the vehicle-center-side case, has a leading end located near the vehicle-center-side case, surrounds the inner wall, and extends rearward along an inner periphery of a mating face with the vehicle-center-side case.

15. The air cleaner structure according to claim 14, wherein the filter member is arranged backward-upward in a rear portion of the air cleaner case, and
an outlet for a liquid component in blowby gas to an outside of the air cleaner case is formed in the air cleaner case below the filter member.

16. The air cleaner structure according to claim 12, wherein an outside-air inlet passage connected to an outside-air suction pipe for suction of outside air into an interior of the air cleaner case is formed forward in the front of the air cleaner case, and
the outside-air suction pipe is disposed outside in a vehicle-width direction along the blowby gas return passage.

17. The air cleaner structure according to claim 13, wherein an outside-air inlet passage connected to an outside-air suction pipe for suction of outside air into an interior of the air cleaner case is formed forward in the front of the air cleaner case, and
the outside-air suction pipe is disposed outside in a vehicle-width direction along the blowby gas return passage.

18. The air cleaner structure according to claim 14, wherein an outside-air inlet passage connected to an outside-air suction pipe for suction of outside air into an interior of the air cleaner case is formed forward in the front of the air cleaner case, and
the outside-air suction pipe is disposed outside in a vehicle-width direction along the blowby gas return passage.

19. The air cleaner structure according to claim 15, wherein an outside-air inlet passage connected to an outside-air suction pipe for suction of outside air into an interior of the air cleaner case is formed forward in the front of the air cleaner case, and
the outside-air suction pipe is disposed outside in a vehicle-width direction along the blowby gas return passage.

20. The air cleaner structure according to claim 14, wherein the air opening pipe is pipe for transferring an intake pressure to the clean room of the air cleaner.

* * * * *